C. H. & H. R. LOUGHRIDGE.
PIPE COUPLING.
APPLICATION FILED MAY 24, 1916.
1,242,568.
Patented Oct. 9, 1917.
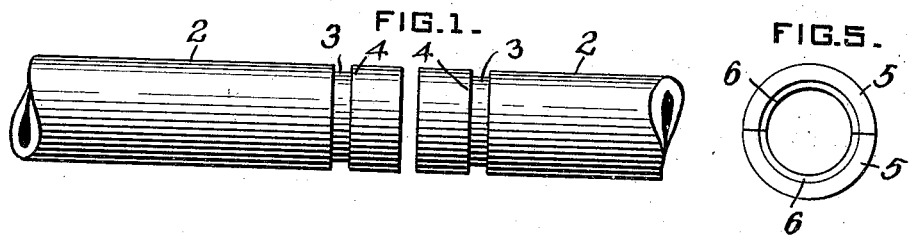
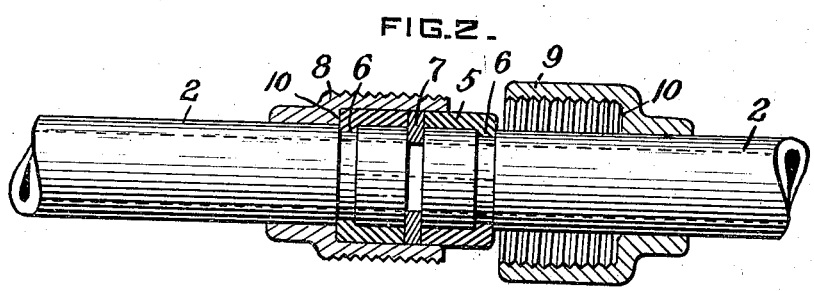
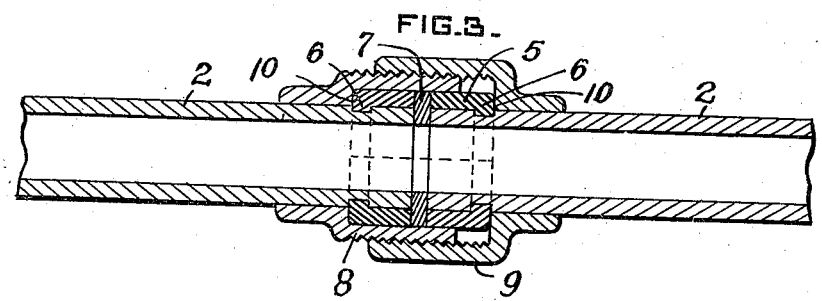
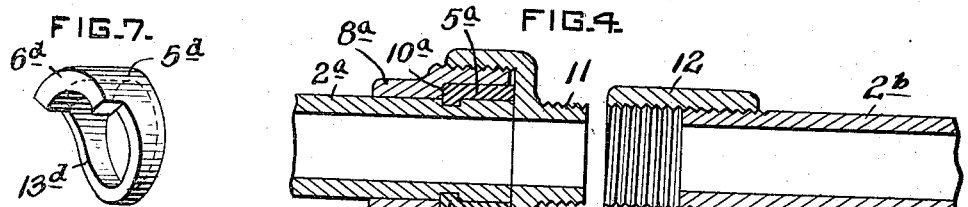
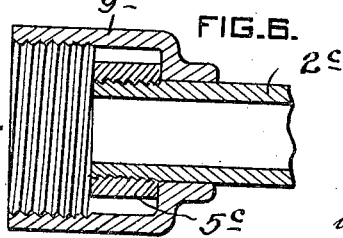

UNITED STATES PATENT OFFICE.

CLYDE H. LOUGHRIDGE AND HOWARD R. LOUGHRIDGE, OF PITTSBURGH, PENNSYLVANIA.

PIPE-COUPLING.

1,242,568.　　　　　　Specification of Letters Patent.　　　　Patented Oct. 9, 1917.

Application filed May 24, 1916.　Serial No. 99,481.

*To all whom it may concern:*

Be it known that we, CLYDE H. LOUGHRIDGE and HOWARD R. LOUGHRIDGE, citizens of the United States, residing at Pittsburgh, in the county of Allegheny and State of Pennsylvania, have invented certain new and useful Improvements in Pipe-Couplings, of which the following is a specification.

Our invention relates to improvements in couplings for pipes, or pipe unions, as they are commonly called, and the principal object is to provide means for rigidly connecting together the ends of adjacent pipe sections, in conduits for wires, etc., in an easy, quick and efficient manner.

We utilize pipe ends having external annular channels and shoulders, embracing collars having co-acting interfitting internal annular abutments fitted to the channels in the pipe ends, or otherwise secured to the pipes, and outer encircling embracing members in threaded engagement with each other and in positive shouldered engagement with the embracing collars.

Preferred forms of the invention are shown in the accompanying drawings, in which—

Figure 1 shows the channels and shoulders on adjacent pipe ends. Fig. 2 is a partial section showing the pipe ends of Fig. 1 with one of the members of the pair of collars fitted on each pipe end, and the embracing members loosely mounted on the pipes in disassociated position.

Fig. 3 is a complete vertical section of the parts shown in Fig. 2, but with the pipes rigidly coupled and all parts in normal fixed position.

Fig. 4 is a vertical section showing a modification adapted to couple a multi-threaded pipe to the ordinary threaded pipe.

Fig. 5 is an end view of a pair of the embracing collars.

Fig. 6 is a sectional detail view showing an integral holding ring threaded on the end of the pipe.

Fig. 7 is a perspective detail view showing an integral ring cut away at one side for insertion over the shouldered end of the pipe.

In connecting up sections of metal piping for wire conduits and the like, there is ordinarily great loss of time, and expensive work, in cutting threads on the ends of the pipes, and joining them up with ordinary threaded coupling links. This is especially true where the pipe has to be cut a great many times on the job.

Each time a cut is made a set of threads has to be turned on the ends. We provide means for cutting the pipe and simultaneously cutting a circular channel in each end thereof. By fitting a co-acting pair of semi-circular collars having embracing flanges onto the ends, and drawing these together by threaded enveloping sleeve members, we are enabled to do all of the threading at the factory, and so save a great deal of time and expense. The collars and sleeves may be cast, or made by machinery in quantities very cheaply.

Referring to the drawings, the pipes 2, 2, which are to be coupled, are provided each with an encircling groove 3, a short distance from its end. This groove provides a shoulder 4 on the pipe end. A pair of round half-rings 5, 5, having interior ridges or shoulders 6, adapted to fit in the grooves 3, embraces the end of each pipe. The members 5 are of proper length to reach just to the ends of the pipes, when properly fitted in the grooves, so that their ends and the pipe ends are in the same transverse plane, thereby providing for a square abutment of such parts and a more rigid coupling. A washer 7 may be fitted between the pipe ends where a fluid-tight connection is desired.

We provide a male sleeve member 8 and a female sleeve member 9, each of interior bore sufficient to slip easily over the pipe ends and thereon beyond the grooves 3. After this the pairs of half rings 5 are fitted into position with the shoulders in the grooves, and the sleeve members advanced over the collar members and overlapping the joint. Threads are provided on the outside of the sleeve member 8 and inside the member 9.

These sleeve members have two interior bores, one just large enough to fit over the pipe, the other larger, providing a shoulder 10. As the sleeve members are engaged and threaded together, the shoulders 10 positively engage the rings 5, the outer ends of which form an abutment for the shoulders 10. When the sleeve members are drawn tightly together in the position shown in Fig. 3, the shoulders 10 have positively engaged rings 5, forcing them, and the pipe ends, tightly together, end to end.

It will be observed that by the construction shown the male sleeve member when slipped down over the collar members, which it engages rather closely, holds the pipe in proper alinement while the other sleeve member is being screwed into place to locate the joint. This is a great convenience in actual laying of the pipes. It will also appear that the mail sleeve forms a complete metal wall about the pipe joint, and that the female sleeve forms a second, or double metal reinforcing wall, while the intermediate collar members greatly strengthen the joint. By this means a perfectly rigid, reinforced, metal incased, solid joint is secured. It is fluid tight, easily and quickly assembled, cheaply made, and highly efficient.

The ends of the pipes fit together and the interiors form a continuous, smooth conduit.

It will be observed that the locking action of the parts is positive in every detail, and there is no chance for wearing loose, or for play in the parts.

In Fig. 4, we show a modified construction in which the collar member 5ª is the same as in the above described form.

The male sleeve member 8ª is shortened so as not to incase the other pipe end. The female sleeve member 9ª has its larger bore threaded to engage the enlarged threaded portion of member 8ª, and its smaller bore is the same size as that of the pipe 2ª. Female member 9ª which is screwed onto member 8ª forms a continuation of the pipe by its reduced extended threaded portion 11 and is adapted to be joined to an ordinary threaded pipe section 2ᵇ by the usual threaded sleeve union 12. By this modification we can readily connect one of our grooved pipe ends to the ordinarily threaded pipe ends with the standard threaded sleeve union.

In Fig. 6 we show a further modification in which the pipe section 2ᶜ when already provided with a threaded terminal, may be utilized with the end of another pipe constructed as above described by using an ordinary threaded ring, thereby forming an abutment for engagement with the inclosing connecting member 9ᶜ of either male or female form.

If desired, the two-part rings 5 may be made in one piece, as shown in Fig. 7, by cutting the ring 5ª away at one side for the major portion of its circumference, as indicated at 13ᵈ.

A partial retaining collar or abutment-engaging shoulder 6ᵈ of sufficient width to embrace a substantial portion of the annular abutment 4 is thus provided, while allowing for easy manipulation of the ring angularly across the end of the pipe.

The many advantages and uses of our device will be apparent to those familiar with the art.

We claim:

1. A coupling for electrical conduit pipes comprising pipe ends in abutting relation each having an annular shouldered groove and a divided embracing collar having internal abutments co-acting with the shouldered grooves, sleeve couplings overlapping the pipe joint and embracing said collars having interior shoulders positively engaging the ends of the collars and in threaded engagement with each other, and a ring washer intervening between the inner ends of the pipes and collars respectively.

2. In a device of the class described, the combination with adjoining sections of a conduit pipe having annular channels near their ends, of sectional collar members adapted to encircle the pipe ends and having interior flanges engaging the channels, of a male sleeve member slidably mounted on one pipe end having an interior bore adapted to embrace the pipe, and a larger bore adapted to pass over the collar members, the junction of the bores forming a shoulder adapted to engage the collar member, and a female sleeve on the other pipe end having a smaller interior bore adapted to embrace the pipe end, a larger bore adapted to embrace the male sleeve member, a shoulder at the junction of the bores adapted to engage the collar member, and threads on the sleeve members whereby they are engaged.

3. In a coupling of the class described, the combination with adjacent pipe sections having annular channels near their ends, of sectional collars adapted to embrace said pipes between their meeting ends and said channels and having interior flanges adapted to engage the channels in the pipes, a male sleeve member slidably mounted on one pipe end having an interior bore adapted to embrace the pipe, and a larger bore adapted to embrace the collar members on both pipe ends, and a female sleeve member mounted on the other pipe end and adapted to engage said male member.

4. In a coupling of the class described, the combination with adjacent pipe sections having annular channels near their ends, of sectional collars adapted to embrace said pipes between their meeting ends and said channels and having interior flanges adapted to engage the channels in the pipes, and sleeves slidably mounted on the pipes having interior shoulders adapted to engage the collars, one sleeve being adapted to pass over both of said collars and screw into the other, and both sleeves overlapping the pipe joint when in engaged position.

5. In a device of the class described, the combination with adjoining sections of a conduit pipe having annular channels near their ends, of sectional collar members adapted to encircle the pipe ends and having interior flanges engaging the channels, of a male sleeve member slidably mounted on one pipe end having an interior bore adapted to embrace the pipe, and a larger bore adapted to pass over the collar members, the junction of the bores forming a shoulder adapted to engage the collar member, the length of the portion having the larger bore being sufficient to cover one pair of said collar members and a portion of the other pair, and a female sleeve on the other pipe end having a smaller interior bore adapted to embrace the pipe end, a larger bore adapted to embrace the male sleeve member, a shoulder at the junction of the bores adapted to engage the collar member, the length of the portion having the larger bore being sufficient to overlap one pair of said collars and a portion of the other pair and the major portion of the male sleeve member, and threads on the sleeve members whereby they are engaged in the portion overlapping the pipe joints.

In testimony whereof we hereunto affix our signatures in the presence of two witnesses.

CLYDE H. LOUGHRIDGE.
HOWARD R. LOUGHRIDGE.

Witnesses:
W. A. HECKMAN,
C. M. CLARKE.

Copies of this patent may be obtained for five cents each, by addressing the "Commissioner of Patents, Washington, D. C."